3,578,627
PROCESS FOR TREATING HIGH VINYL LIQUID POLYBUTADIENE WITH SULFURIC ACID
Stephen Boutsicaris, Akron, Ohio, assignor to The Firestone Tire & Rubber Company, Akron, Ohio
No Drawing. Filed June 16, 1969, Ser. No. 833,689
Int. Cl. C08d 5/02; C08f 27/00
U.S. Cl. 260—94.4
12 Claims

ABSTRACT OF THE DISCLOSURE

The process disclosed herein comprises the treatment of a high-vinyl liquid polybutadiene with concentrated sulfuric acid to convert the liquid polybutadiene to a tough thermoplastic elastomer. The liquid polybutadiene has at least 60% of the repeating units therein of the pendent vinyl type, and has an average molecular weight of 2,000–10,000. The polybutadiene is treated while in dilute solution in a hydrocarbon solvent which is inert to sulfuric acid, such as toluene, benzene, xylene, etc. The sulfuric acid is of at least 80% concentration, preferably at least 95%, and is used in a proportion of 5–15 parts by weight per 100 parts of polymer.

BACKGROUND OF THE INVENTION

Field of the invention

The present invention relates to treatment of high-vinyl liquid polybutadiene with concentrated sulfuric acid. More specifically it relates to a process for converting high-vinyl liquid polybutadiene to a tough, millable elastomer.

Description of the related prior art

The Rollman U.S. Pat. No. 3,299,032 describes the treatment of solid polybutadienes for improvement in resistance to cold flow by dissolving the solid resin in a hydrocarbon solvent and then treating with concentrated sulfuric acid dispersed in a hydrocarbon. In addition to using as the starting material a rubber or solid material having an inherent viscosity of 0.75 to 3, these polybutadienes are also described as having "6 to 10 percent 1,2-addition," which corresponds to 6–10 percent of the butadiene repeating units having pendent vinyl groups as referred to herein.

Shelton and Lee in "Rubber Chemistry Technology," 31, 415 (1958) describe the cyclization of polybutadiene by treatment of the polybutadiene while dissolved in xylene with concentrated sulfuric acid at a temperature of 140° C. Considerable crosslinking and gelation is effected and the product is a powdery precipitate.

Gaylord et al., "Journal of Polymer Science," Part A, volume 2, 3969 (1964) likewise show the cyclization of polybutadiene to a powdery precipitate by treatment with sulfuric acid in toluene suspension.

These prior art references start with a solid polybutadiene, with very low vinyl content, and produce products which are considerably changed in viscosity, and in the latter two references the product is actually a powdery precipitate.

SUMMARY OF THE INVENTION

In accordance with the present invention, it has now been found that liquid polybutadienes having at least 60% butadiene repeating units of the pendent vinyl type can be treated while in relatively dilute solution with concentrated sulfuric acid to produce a tough, millable thermoplastic elastomer. Surprisingly, however, in spite of the change in the physical properties of the polybutadiene effected by this treatment, there is little or no increase in inherent viscosity and in molecular weight. However there are changes effected which produce a tough thermoplastic elastomer which is entirely different from the powdery cyclized polymer shown in the prior art.

The liquid polybutadiene used in this process advantageously has an average molecular weight of 2,000–10,000 and a vinyl-repeating unit content, e.g. the butadiene repeating unit having a pendent vinyl group, of at least 60% and preferably at least 80%. The polybutadiene is treated while in dilute solution, that is 5–25 percent by weight, in a solvent, preferably one substantially inert to the concentrated sulfuric acid, such as tetrahydrofuran, high boiling ethers, e.g. dibutyl ether, etc., but preferably hydrocarbons such as benzene, toluene, xylene, etc. The solvent must be capable of dissolving or be miscible with the sulfuric acid and must have a boiling point sufficiently high to accommodate the temperature used during the treatment, although pressure may be used if desired to raise the boiling point of the solvent.

The process of this invention is effected very quickly, simply and economically and is easily and accurately controlled. Moreover, the product is very easily recovered and can be processed in solution or after precipitation to give products which can be compounded and milled.

This process provides a smooth, simple means for converting low molecular weight, liquid polybutadienes to strong, tough thermoplastic elastomers. These products can be used as the matrices in producing thermoset composites and can be compounded in various manners suitable for compounding rubber in view of their millable character.

As is obvious from the absence of substantial change in viscosity, there is no crosslinking or chain length increase effected by the treatment. Generally, the inherent viscosity of the treated product is no more than 0.32 (measured in cyclohexane solution). The sulfuric acid treatment is effected at a temperature from room temperature (about 20° C.) to 120° C. The minimum time for treatment depends on the temperature being applied. For example, the minimum temperature for effecting a substantial amount of the change described herein is five minutes at 120° C.; at least six hours is required at 70° C.; at least ten hours at 50° C.; and at least 24 hours at room temperature. These will vary somewhat also with the percent vinyl content of the polybutadiene being treated, also with the proportions and concentrations of sulfuric acid and also with the concentration of the polymer in the solvent.

If higher molecular weight polybutadienes are used or if higher concentrations of the same are used, the product is generally gelled. By limiting the molecular weight and by limiting the concentration to no more than 25 percent, preferably no more than 15 percent, a millable tough elastomer is obtained. In cases where a gelled product is obtained within the ranges specified, an ungelled elastomer can be obtained by using a lower temperature, or a shorter reaction time, or a smaller amount of sulfuric acid.

As previously indicated the elastomer product shows little or no increase in viscosity or average molecular weight over that of the starting liquid polybutadiene even though it has changed in physical characteristics from a liquid to a millable elastomer. While the starting molecular weight is not more than 10,000, the product has an average molecular weight well below 15,000 and generally no more than 12,000.

The thermoplastic elastomer product of this invention can be compounded in a manner similar to that used with rubber and other synthetic elastomers, using fillers and other modifiers similar to those used with rubber and other elastomers.

SPECIFIC EMBODIMENTS

The invention can be illustrated by the following examples. These examples are intended merely for illustration and are not to be regarded as limiting in any manner the scope of this invention nor the manner in which it may be practiced. In these examples, as well as throughout the specification, unless otherwise specified, parts and percentages are given by weight.

EXAMPLE I

A polybutadiene (134 g.) having a molecular weight of 3,800 and a vinyl repeating unit content of 10% is dissolved in 1,500 ml. of toluene by stirring in a flask at ambient temperature for 45 minutes. Then 14 g. of concentrated sulfuric acid (96%) is added slowly under vigorous agitation and the stirring is continued for 18 hours at 85° C. At the end of this period, the resultant dark mixture is cooled to about 40° C., poured into a large excess of methanol and the precipitate washed with water and filtered. This product resembles very closely the original polymer in its physical characteristics. Infrared analysis shows no change from the starting polybutadiene. This experiment shows that the acid treatment of this invention is not effective on a polybutadiene having a vinyl repeating unit content of 10%.

EXAMPLE II

The procedure of Example I is repeated using a polybutadiene having a vinyl repeating unit content of 65%. This polymer is liquid, has a molecular weight of 3,500, an inherent viscosity of 0.14 (measured in cyclohexene) and is used in a proportion of 134 g. dissolved in 780 ml. of toluene and is treated with 19.5 g. of 96% sulfuric acid at 84° C. for 18 hours. The product obtained is a tough, millable elastomer soluble in tetrahydrofuran, chloroform, etc., and has an inherent viscosity of 0.145 in cyclohexane. Compounding with silica and curing with dicumyl peroxide gives a thermoset product of 108 Rockwell M hardness.

EXAMPLE III

The procedure of Example I is repeated in a series of three experiments using in each case an 11.5% toluene solution of a polybutadiene having a molecular weight of 5,500, an inherent viscosity of 0.209 in cyclohexane and a vinyl repeating unit content of 70%. The amount of sulfuric acid is varied as indicated in the table below, and the treatment is continued in each case for 20 hours. The results given in the table indicate that with less than 5 parts of 96% sulfuric acid per 100 parts of polymer, there is no reaction. With 7.1 parts of acid, there is some reaction under these conditions, and by extending the reaction time or raising the temperature the amount of reaction can be increased to give a millable elastomer. Under the present conditions the 14.1 parts of acid give very good results.

TABLE I

| Sulfuric acid (phr.) | Product obtained | Inherent viscosity |
|---|---|---|
| 4.5 | No reaction | 0.209 |
| 7.1 | Slight reaction | 0.209 |
| 14.1 | Elastomer | 0.320 |

EXAMPLE IV

The procedure of Example I is repeated twice using in one case a 15% solution of resin and in the other case 9.2% of resin in toluene. The polybutadiene is the same as used in Example III and each solution is treated with 13.7 parts of 96% sulfuric acid per 100 parts of polymer for 19 hours at 65° C. The 15% solution of resin gelled at the end of the reaction time, while the more dilute solution gave a normal elastomer product. Repeating with the 15% solution at lower temperature and/or shorter period also gives a non-gelled elastomeric product.

EXAMPLE V

The elastomer product obtained from the more dilute solution in Example IV is compounded as follows:

| | Parts |
|---|---|
| Elastomer | 100 |
| Silica | 300 |
| Triallyl cyanurate | 4 |
| Dicup 40 (40% peroxide) | [1] 20 |

[1] 8 parts dicumyl peroxide.

The mixture is milled to obtain uniform mixture, then removed as a sheet and cured at 160° C. for 40 minutes. The resulting thermoset sheet shows the following properties:

Rockwell M hardness—100
Bending modulus—1,290,000 p.s.i.
Izod impact strength—0.25 ft. lbs./in. notched

The invention claimed is:
1. A process for producing a tough, millable elastomer from a liquid, low molecular weight polybutadiene comprising the steps of:
   (1) treating a polybutadiene having an average molecular weight of 2,000–10,000 and having at least 60% of the butadiene repeating units therein of the pendent-vinyl structure, while contained in a solvent in a concentration of 5–25 percent by weight, with 5–15 parts by weight of a concentrated sulfuric acid having a concentration of at least 80 percent by weight, at a temperature of 20–120° C., said acid and said solution being maintained in intimate contact until a millable elastomer product is produced, and
   (2) thereafter separaing said acid from said millable elastomer.
2. The process of claim 1 in which said acid treatment is conducted for a period of at least five minutes for temperatures at or below 120° C., for at least six hours at temperatures of 70° C. or below, for at least ten hours at temperatures of 50° C. or below, and for 24 hours at a temperature of approximately 20° C.
3. The process of claim 1 in which the polybutadiene has at least 80% of its repeating units of the pendent-vinyl structure.
4. The process of claim 3 in which said sulfuric acid has a concentration of at least 95%.
5. The process of claim 1 in which said sulfuric acid has a concentration of at least 95%.
6. The process of claim 1 in which said temperature is in the range of 50–80° C. and said intimate contact is maintained for at least six hours.
7. The process of claim 5 in which said temperature is in the range of 50 to 80° C.
8. The process of claim 6 in which said solvent is a hydrocarbon liquid at said temperature.
9. The process of claim 6 in which said solvent is toluene.
10. The process of claim 1 in which said solvent is toluene.
11. The proces of claim 1 in which said polybutadiene solution has a concentration of 5–15 percent by weight of polybutadiene

12. A tough millable elastomer having a molecular weight no greater than 12,000 produced according to the process of claim 1.

References Cited

UNITED STATES PATENTS

| | | | |
|---|---|---|---|
| 2,560,164 | 7/1951 | Garb | 260—94.7UX |
| 3,299,032 | 1/1967 | Rollmann | 260—94.7 |

FOREIGN PATENTS

| | | | |
|---|---|---|---|
| 992,210 | 5/1965 | Great Britain | 260—94.7 |

OTHER REFERENCES

Molecular Weight Jump Reaction by Engel et al., Rubber Age, December 1964, pp. 410–415.

JAMES A. SEIDLECK, Primary Examiner

W. F. HAMROCK, Assistant Examiner

U.S. Cl. X.R.

260—41.5, 94.2, 94.7, 96